United States Patent
Pirzada et al.

(10) Patent No.: US 8,359,366 B2
(45) Date of Patent: Jan. 22, 2013

(54) SYSTEMS AND METHODS FOR PROVIDING A DESKTOP IMAGE TO AN INFORMATION HANDLING SYSTEM

(75) Inventors: Fahd Pirzada, Austin, TX (US); Gaurav Chawla, Austin, TX (US); Stephen Gouze Luning, Austin, TX (US); Yuan-Chang Lo, Austin, TX (US)

(73) Assignee: Dell Products L.P., Round Rock, TX (US)

(*) Notice: Subject to any disclaimer, the term of this patent is extended or adjusted under 35 U.S.C. 154(b) by 380 days.

(21) Appl. No.: 12/564,123

(22) Filed: Sep. 22, 2009

(65) Prior Publication Data

US 2011/0072069 A1    Mar. 24, 2011

(51) Int. Cl.
*G06F 15/167*    (2006.01)
*G06F 15/177*    (2006.01)

(52) U.S. Cl. ............. 709/212; 709/203; 709/216; 713/2

(58) Field of Classification Search .................. 709/203, 709/213–227; 713/2
See application file for complete search history.

(56) References Cited

U.S. PATENT DOCUMENTS

| | | | |
|---|---|---|---|
| 7,343,468 B2 | 3/2008 | Li et al. | |
| 7,363,479 B1 | 4/2008 | Walker et al. | |
| 7,389,401 B2 | 6/2008 | Li et al. | |
| 2003/0088650 A1* | 5/2003 | Fassold et al. | 709/220 |
| 2003/0187883 A1* | 10/2003 | Zelenka et al. | 707/201 |
| 2006/0184650 A1 | 8/2006 | Abali et al. | |
| 2008/0046708 A1* | 2/2008 | Fitzgerald et al. | 713/2 |
| 2008/0183973 A1 | 7/2008 | Aguilera et al. | |
| 2008/0229040 A1* | 9/2008 | Honma | 711/162 |
| 2009/0165097 A1* | 6/2009 | Cherian et al. | 726/5 |

OTHER PUBLICATIONS

Desktop Virtualization-Citrix Server High Availability, Sanbolic, www.sanbolic.com, Jul. 10, 2009.
Citrix Provisioning Services for Desktops, Citrix, www.citrix.com, Jul. 10, 2009.

* cited by examiner

*Primary Examiner* — Yasin Barqadle
(74) *Attorney, Agent, or Firm* — Baker Botts L.L.P.

(57) ABSTRACT

An information handling system (IHS) is provided in the context of providing a desktop image. The IHS may include a storage device and a client device. The IHS may also include a management server configured to establish communication between the storage device and the client device. In addition, the client device may be configured to boot directly from the storage device and wherein the data communication occurs only between the storage device and the client device.

18 Claims, 3 Drawing Sheets

SYSTEMS AND METHODS FOR PROVIDING A DESKTOP IMAGE TO AN INFORMATION HANDLING SYSTEM

TECHNICAL FIELD

The present disclosure relates generally to the field of information handling systems, and more specifically, to client devices in a desktop streaming environment.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presently, desktop streaming has become more prevalent in information handling systems. Generally, desktop streaming may be a method of providing a standard desktop image to various information handling systems over a network. A desktop image may, for example, include an operating system (OS) image, a boot image, and/or one or more application programs. Furthermore, a network may include, but is not limited to, a Local Area Network (LAN), a Wide Area network (WAN) such as the Internet, or a virtual private network (VPN). Additionally, desktop streaming may be referred to by various other names such as Dell's On Demand Desktop Streaming (ODDS), for example. Other titles used by other vendors may include OS streaming, diskless clients, and the like.

In a typical desktop streaming implementation, individual information handling systems, which may be referred to as clients, may be in communication with one or more management servers. Through such management servers, the clients may be able to communicate with a storage array used to store data. For example, management servers may be configured to facilitate input/output (I/O) commands between the clients and the storage array.

Under such an implementation however, certain inefficiencies may arise in operation. For example, if a management server were to crash or otherwise fail, all clients managed by the management server may also crash or fail since the clients rely on the management server to maintain the connection to the storage array. Furthermore, having the management server maintain the connection between the clients and the storage array may tie up valuable resources that the management sever could expend elsewhere.

Thus, a need exists for systems, methods, and media for initiating a direct connection between the clients and the storage array while the management server remains outside the connection.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for an information handling system. The information handling system may include a storage device, a client device, and a management server. The management server may be configured to establish data communication between the storage device and the client device. Furthermore, the client device may be configured to boot directly from the storage device, and the data communication may occur only between the storage device and the client device.

Another aspect of the present disclosure provides for a method for providing a desktop image to an information handling system. The method may include storing a boot image on a storage device and selecting a management server to establish data communication between a client device and the storage device. The method may further include booting the client device directly from the storage device. Additionally, the data communication may occur only between the storage device and the client device.

A further aspect of the present disclosure provides for a method for providing a desktop image to an information handling system. The method may include assigning a boot image to a client device and creating a thin clone on a storage device to provide a write space for the client device. Furthermore, the method may include establishing direct communication between the client device and the storage device and booting the client device from the thin clone via the boot image.

Another aspect of the disclosure provides a computer-readable medium having computer-executable instructions for performing a method for providing a desktop image to an information handling system. The method may include storing a boot image on a storage device and selecting a management server to establish data communication between a client device and the storage device. The method may further include booting the client device directly from the storage device. Additionally, the management server may reside outside of the data communication between the client device and the storage device.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
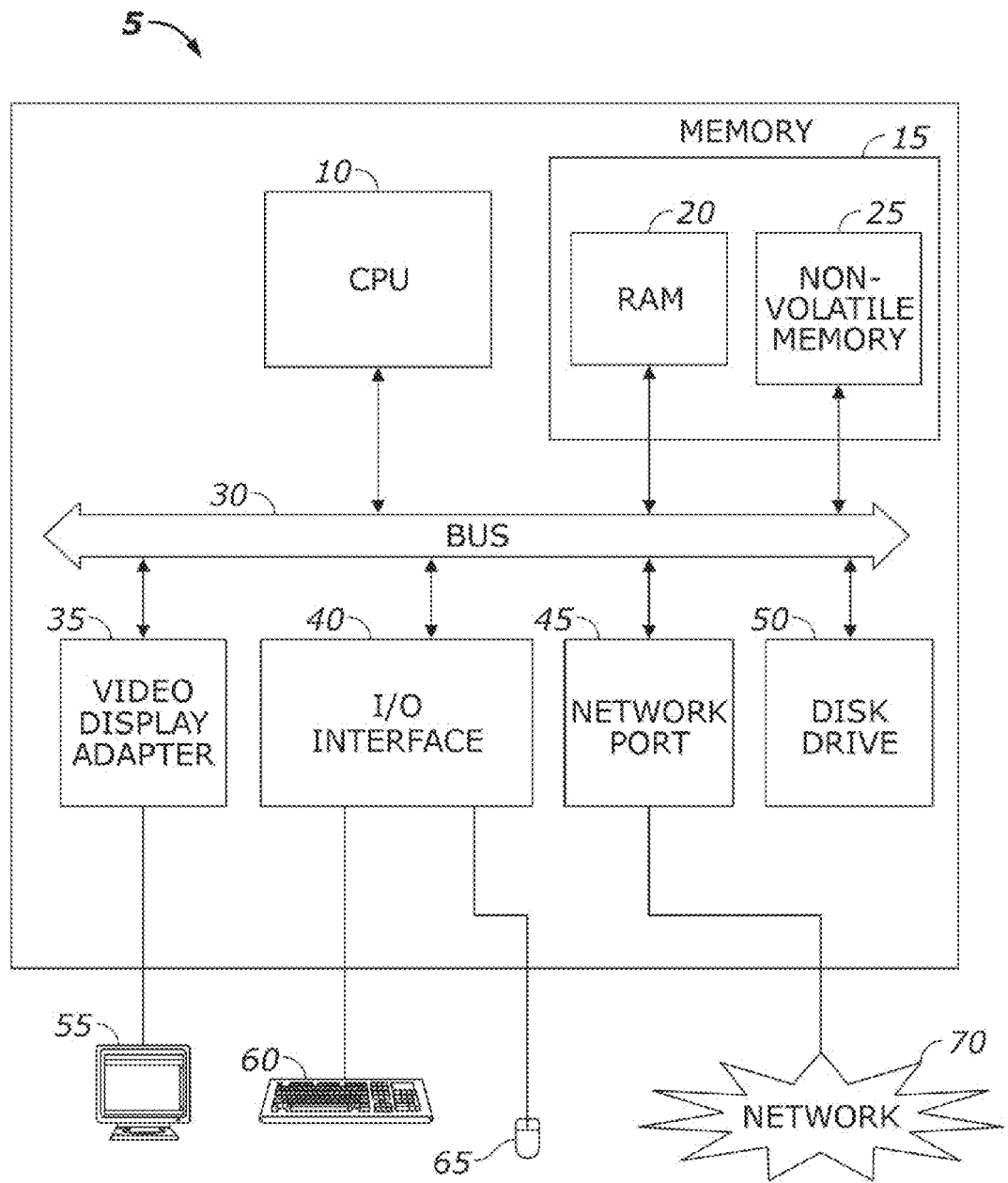
FIG. 1 represents an information handling system (IHS) in accordance with one aspect of the present disclosure.

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a thin clone" refers to one or thin clones, and reference to "a method of providing" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
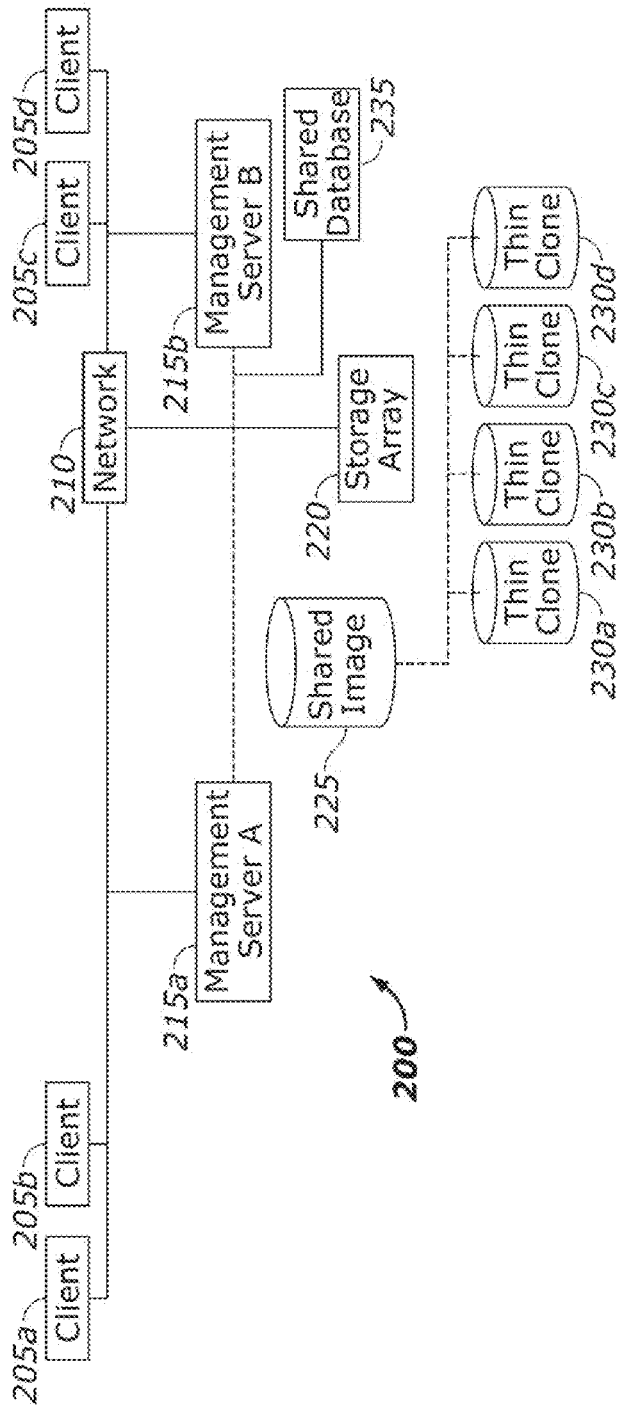
FIG. 2 provides a schematic of a desktop streaming architecture in accordance with one aspect of the present disclosure.

FIG. 2 provides a schematic illustrating a desktop streaming architecture 200 in accordance with one aspect of the present disclosure. The desktop streaming architecture 200 may include client IHSs 205a-d. Furthermore, a client IHS 205a may be referred to as a client or client device and may include, but is not limited to, a client having a storage disk drive, a thin client, i.e., a client IHS 205a that may be configured without a local hard disk drive, and/or a virtual machine. As such, the client IHS 205a-d may be configured to access storage array 220 through the network 210 via one or more management servers (i.e., provisioning servers) 215a-b. To this end, the client IHS 205a-d may include a processor and memory in communication with the processor (not pictured). In addition, the client IHS 205a-d may also include a network interface device, such as a network interface card (NIC) for example, to communicate with various components over a network 210. In certain implementations, the client IHS 205a-d may be a personal IHS, a workstation, a portable IHS, and/or the like. In yet another implementation, the client IHS 205a-d may be a virtual machine hosting a software image, such as a shared image 225, which is discussed in more detail later. To this end, the virtual machine and/or shared image 225 may be stored in a datacenter, which may include management servers 215a-b, the storage array 220, and/or any other storage area. Moreover, while FIG. 2 depicts the desktop streaming architecture 200 as having four client IHSs 205a-d, it should be understood that any number of client IHSs 205a-d may be contemplated.

Each client IHS 205a-d may also be in communication with one or more management servers 215a-b through the network 210. Generally, the management servers 215a-b may be configured to manage the access of one or more client IHSs 205a-d to the storage array 220. To this end, each management server 215a-b may comprise an information handling system, which may include a processor, memory in communication with the processor, and a network interface to communicate with various devices over the network 210. Additionally, the management servers 215a-b may be in communication with a shared database 235, which may store data relationships, such as mappings, between client IHSs 205a-d and the storage array 220. The shared database 235 may be further described with reference to FIG. 3. In one implementation, the management servers 215a-b may be configured to manage access to and distribute disk images to client IHS 205a-d. In such implementations, the management servers 215a-b may be referred to as image management servers. Furthermore, though FIG. 2 illustrates the desktop streaming architecture 200 as having two management servers 215a-b, shown as management server A and management server B, it should be understood that any number of management servers are also contemplated within the present disclosure.

The network 210 may be any type of network or communications architecture configured to couple the components of the desktop streaming architecture 200 to one another. Various implementations of the network may include, but are not limited to, Local Area Networks (LANs), Wide Area Networks (WANs) such as the Internet, Personal Area Networks (PANs), Storage Area Networks (SANs), or Virtual Private Networks (VPNs). In one implementation, the network 210 may include a wireless network (e.g., wireless LAN) to which a client IHS 205a-d may be coupled. In such an implementation, the client IHS 205a-d may need specific drivers in order to be appropriately coupled to the network 210. To this end, the client IHS 205a-d may include flash memory, for example, configured to store the drivers.

In certain implementations, the network 210 and the management servers 215a-b may be configured to manage client IHS 205a-d access to the storage array 220. By way of the network 210, portions of the storage array 220 may appear to a client IHS 205a-d as locally attached storage despite not being physically connected to the client IHS 205a-d. The storage array 220 may include any number and/or combination of suitable storage devices configured to store data. Such storage devices may include, but are not limited to, hard disk drives, solid state storage drives, magnetic tape drives, optical drives, and flash memory drives. In one implementation, different combinations of storage devices within the storage array 220 may appear to information handling systems as one or more logical units. For example, a logical unit may appear to a client IHS 205a-d or a management server as a single storage resource, though the logical unit may include a combination of one or more storage devices within the storage array 220.

As further depicted in FIG. 2, the desktop streaming architecture 200 may also include a shared image (i.e., boot image) 225 stored on the storage array 220. The shared image 225 may include data, applications, and/or other types of programs that may be accessed or used by more than one client IHS 205a-d. For example, the shared image 225 may include an OS, which may be accessed and executed by one or more client IHSs 205a-d. The shared image may also include various other programs, applications, drivers, and/or the like shared across multiple client IHS 205a-d.

In one implementation, the shared image 225 may be a boot image used to boot the client IHSs 205a-d. Under this scenario, the shared image 225 may be cloned or reproduced for each client IHS 205a-d. For example, thin clones 230a-d may be created to act as write spaces for each client IHS 205a-d. Write spaces may refer to designated areas for a particular client IHS 205a-d to read or store data. Thin clones 230a-d may also allow for the creation of an image template, such as of the shared image 225 or boot image, while using a relatively low amount of storage resources. For instance, a thin clone 230a-d may store only the differences from the shared image 225 that may be associated with a particular client 205a-d. Thus, a particular thin clone 230a-d for a client 205a-d may not need to store an entire copy of the shared image 225, thereby saving some storage space. While FIG. 2 depicts one thin clone 230a-d for each client 205a-d, it should be understood that any number and/or combination of thin clones 230a-d and clients 205a-d are also contemplated within the present disclosure.

In implementations where the shared image may be a boot image, the boot process for a client IHS 205a-d may be thought of as a two-tiered process. The first part of the boot process may entail the client IHS 205a-d communicating and/or contacting a management server 215a-b. In the second part of the boot process, the management server 215a-b may allocate resources on the storage array 220 for the client IHS 205a-d. From here, the client IHS 205a-d may boot directly from the storage array 220.

Furthermore, the boot process may differ slightly depending on whether the client IHS 205a-d is communicating with the network 210 through a wired LAN interface or a wireless LAN interface. If the client IHS 205a-d is communicating with the network 210 through a wired LAN interface, the first part of the boot process may be handled normally, such as through the Citrix Ardence software for example. Such software may already include wired LAN drivers for the client IHS 205a-d to communicate over the network 210 with the management server 215a-b.

If the client IHS 205a-d is communicating with the network using a wireless LAN interface, however, wireless drivers may not be immediately available to the client IHS 205a-d through conventional means. Thus, the client IHS 205a-d may have flash memory to store wireless network drivers. The wireless network drivers may be used to establish communication with a management server 215a-b. In either the wired LAN or wireless LAN scenario, the second part of the boot process may be handled by the Internet Small Computing Systems Interface (iSCSI). For example, Microsoft Inbox iSCSI initiator may be employed.

Figure 3:
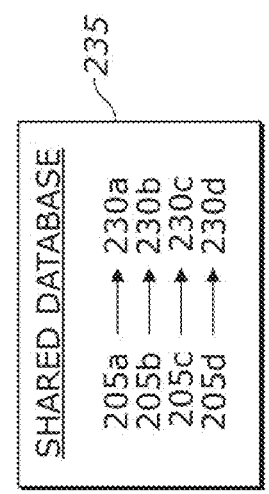
FIG. 3 provides a schematic of the shared database in FIG. 2.

FIG. 3 provides a schematic of a shared database 235 shared across management servers in accordance with FIG. 2. As depicted in FIG. 3, the shared database 235 may include various mappings of client IHSs 205a-d with thin clones 230a-d on the storage array. For purposes of illustration only, client IHS 205a may be mapped to thin clone 230a, client IHS 205b to thin clone 230b, client IHS 205c to thin clone 230c, and client IHS 205d to thin clone 230d. It should be noted that any number and/or combinations of client IHS to thin clone mapping are also contemplated within the present disclosure. In one implementation, modifications that may be made to the shared database 235 by a particular management server or other device may be communicated to all other management servers. In this manner, each management server may maintain a similar or identical copy of the shared database 235. Furthermore, it should be noted that the shared database 235 may operate without the need for a clustered file system.

Figure 4:
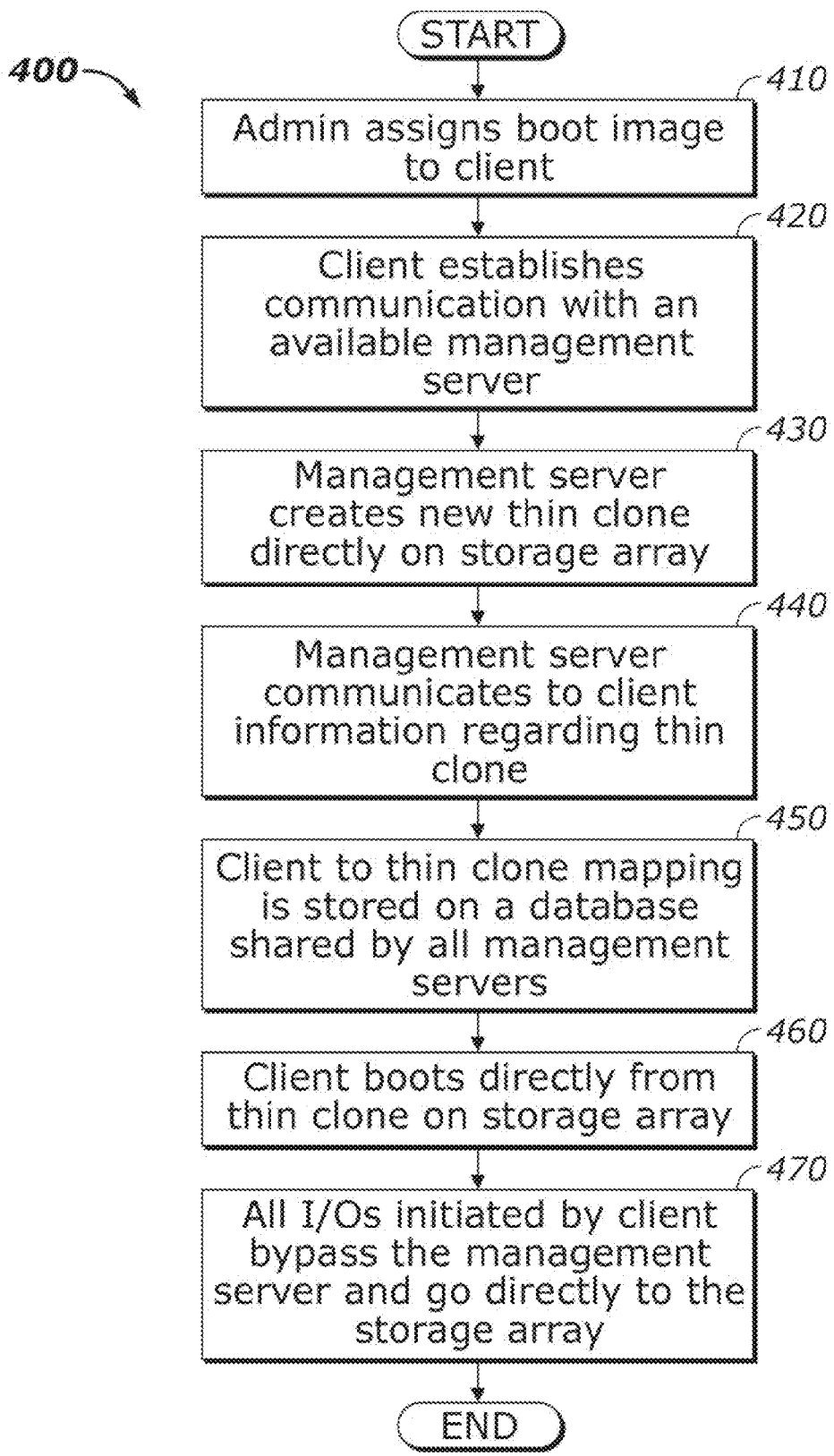
FIG. 4 provides a flow diagram illustrating a method for providing a desktop image to an information handling system in accordance with one aspect of the present disclosure.

FIG. 4 represents a flow diagram illustrating a method 400 for providing a desktop image to an information handling system in accordance with one aspect of the present disclosure. The method may begin in step 410 where a boot image may be assigned to a client device. Such an assignment may be based on any number of methods such as an algorithm, randomly, an administrator's decision, or the like.

Next, in step 420, the client may establish communication with an available management server by any suitable manner. Various methods exist by which an available management server may be selected. For example, the client and/or the management server may include data that specifies the client and the management server are to be associated. In another implementation, clients and management servers may be associated at random. In yet another implementation, clients may be associated with a management server depending on the operational characteristics of the management server. Such operational characteristics may include, but are not limited to, the number of clients currently associated with the management server, the speed at which the client and management server can communicate, and the physical distance between the client and the management server.

Once communication has been established between the client and management server, the management server may create a new thin clone directly on a storage array in step 430. The thin clone may include access rights specific to the client such that the client may access the thin clone as its write space. In one implementation, the thin clone may be used to store the boot image for the client and/or any differences from the boot image associated with the client.

Furthermore, the storage array may communicate with the thin client(s) and/or management server(s) using a storage network protocol, such as the Internet Small Computing System Interface (iSCSI). iSCSI may be an Internet Protocol (IP)-based storage networking standard for establishing communication between storage facilities and/or devices. To this end, iSCSI may enable normal SCSI commands to be carried over IP networks, thereby facilitating communication between storage devices over long distances and complex networks. Moreover, iSCSI may be implemented over currently existing networks without the need for special cabling or other proprietary requirements. In addition, through the implementation of iSCSI, the thin clone created on the storage array may appear to the client as locally attached storage though the physical distance between the storage array and the client may remain relatively far.

In step 440, the management server may communicate to the client information regarding the thin clone such that the client may establish a direct connection with the thin clone, and thereby the storage array. As mentioned above, such a line of communication may be implemented using iSCSI. Next, in step 450, the mapping between the client and thin clone is stored on a shared database. The shared database may be shared across the management servers so that the management servers may be aware of all relationships between the clients and thin clones.

Once the client and thin clone have established communication, the client may boot directly from the thin clone using the boot image in step 460. Thereafter, all I/O communication initiated by the client to the thin clone, and thereby the storage array, may bypass the management server. In this manner, the management server may be said to remain outside the connection or data path between the client and the storage array. In other words, once the management server has successfully established communication between the client and the storage array, the management server may have no part in processing and/or handling the data communicated between the client and storage array. The data communication may occur only between the client and the storage array. Such a characteristic may be in contrast to the current art in which the management server must constantly process I/O requests and responses between the client and the storage array. Notably, upon deletion of a client and/or in the event of a client reboot, the management server(s) may delete the existing thin clone that is mapped to the client.

Thus, because the management server need not handle and relay such input/output operations between the client and the storage array, the server may have more resources to expend on other tasks. For example, because of the newly freed resources, the management server may be capable of managing a greater number of clients between the network and storage array. Consequently, more clients can be supported, and the overall efficiency of the desktop streaming architecture may be increased.

In addition, having the management server remain outside of the connection between the client and the storage array ensures high availability of data during failover scenarios. For instance, if a management server were to experience a crash or other form of failover, clients may continue to function normally with the storage array since the management server may not be required to manage such communication. Furthermore, data from the failed management server may be re-provisioned to the remaining management servers.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by a computer. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system (IHS) for providing a desktop boot image to a remote client, the system comprising:
   a storage device;
   a communication network; and
   a management server associated with the storage device configured to establish, via the communication network, data communication between the storage device and the remote client device, wherein:
   the remote client device communicates with the management server and, in response, the management server allocates resources on the storage device to the remote client device;
   the management server creates a thin clone on the storage device to provide a write space for the remote client device;
   the remote client device is configured to boot directly from the thin clone using a boot process;
   the boot process includes at least one communication through a local area network (LAN) or a wireless local area network (WLAN) interface; and
   the boot process communication occurs only between the storage device and the remote client device.

2. The system of claim 1, wherein the boot process is handled partly via an Internet Small Computer System Interface (iSCSI).

3. The system of claim 1 further comprising a shared database stored on the management server, the shared database configured to store a mapping between the client device and the thin clone.

4. The system of claim 1, wherein the communication with the network is a LAN connection, and wherein the client device comprises flash memory to store drivers for the WLAN connection.

5. The system of claim 1, wherein the management server is an image management server configured to manage access of the client device to a disk image.

6. The system of claim 1, wherein input/output communications initiated by the client device for the storage device bypass the management server and proceed directly to the storage array.

7. A method for providing a desktop boot image to a client device, the method comprising:
- storing the desktop boot image on a storage device;
- selecting a management server associated with the storage device configured to establish, via a communication network, data communication between the client device and the storage device;
- allocating, by the management server, resources on the storage device to the client device, wherein the resources are allocated in response to data communication between the client device and the management server;
- creating by the management server a thin clone on the storage device to provide a write space for the client device and
- booting the client device directly from the thin client using a boot process, wherein the boot process communication occurs only between the storage device and the client device, and wherein the boot process includes at least one communication through a local area network (LAN) or a wireless local area network (WLAN) interface.

8. The method of claim 7, wherein the boot process between is handled partly via an Internet Small Computer System Interface (iSCSI).

9. The method of claim 7, wherein selecting the management server is based on an operational characteristic of the management server.

10. The method of claim 7 further comprising creating a thin clone on the storage device to provide a write space for the client device, wherein the thin clone comprises differences from the base image.

11. The method of claim 10, wherein booting directly from thin client comprises booting from the desktop boot image.

12. The method of claim 10 further comprising storing a mapping between the client device and the thin clone on a shared database in communication with the management server.

13. The method of claim 7, wherein the connection is a wireless Local Area Network (LAN) connection.

14. The method of claim 13 further comprising storing drivers for the wireless LAN connection on the client device.

15. A method for providing a desktop boot image to a client device, the method comprising:
- assigning the desktop boot image to the client device;
- receiving a communication from the client device at a management server and, in response to the communication, allocating resources on a storage device to the client device, wherein the management server is associated with the storage device and configured to establish data communication between the storage device and the client device;
- creating a thin clone on the storage device to provide a write space for the client device, wherein the thin clone is created by the management server;
- establishing direct communication between the client device and the storage device;
- booting the client device directly from the thin clone using a boot process, wherein the boot process includes at least one communication through a local area network (LAN) or a wireless local area network (WLAN) interface; and
- communicating the boot process only between the thin clone and the client device.

16. The method of claim 15, wherein the boot process is handled partly via an Internet Small Computer System Interface (iSCSI).

17. The method of claim 15 further comprising storing a mapping between the client device and the thin clone on a shared database.

18. The method of claim 15, wherein the thin clone is configured to store differences from the boot image associated with the client device.

* * * * *